US008479576B2

(12) United States Patent
Wang

(10) Patent No.: US 8,479,576 B2
(45) Date of Patent: Jul. 9, 2013

(54) MEMS DEVICE AND DEFORMATION PROTECTION STRUCTURE THEREFOR AND METHOD FOR MAKING SAME

(75) Inventor: Chuan-Wei Wang, Taoyuan (TW)

(73) Assignee: Pixart Imaging Incorporation, Hsin-Chu (TW)

( * ) Notice: Subject to any disclaimer, the term of this patent is extended or adjusted under 35 U.S.C. 154(b) by 274 days.

(21) Appl. No.: 12/932,869

(22) Filed: Mar. 8, 2011

(65) Prior Publication Data
US 2012/0167683 A1 Jul. 5, 2012

(30) Foreign Application Priority Data
Dec. 30, 2010 (TW) ................................ 99146877 A

(51) Int. Cl.
*G01P 15/125* (2006.01)
*G01R 3/00* (2006.01)
*H01S 4/00* (2006.01)
(52) U.S. Cl.
USPC ......................... 73/514.32; 29/592.1; 29/595
(58) Field of Classification Search
USPC .. 73/514.32, 514.33, 514.34, 514.38; 438/48, 438/50–53; 257/414–418; 29/592.1, 595
See application file for complete search history.

(56) References Cited

U.S. PATENT DOCUMENTS

| | | | |
|---|---|---|---|
| 4,901,570 A | 2/1990 | Chang et al. | |
| 7,237,316 B2 | 7/2007 | Sakamoto | |
| 7,258,012 B2 * | 8/2007 | Xie | 73/514.32 |
| 7,268,463 B2 * | 9/2007 | Li et al. | 310/309 |
| 2004/0231420 A1 * | 11/2004 | Xie et al. | 73/514.32 |
| 2007/0199191 A1 | 8/2007 | Sakamoto | |
| 2010/0050771 A1 | 3/2010 | Je et al. | |
| 2010/0212426 A1 * | 8/2010 | Oshio | 73/514.32 |
| 2010/0242606 A1 * | 9/2010 | Kanemoto | 73/514.38 |
| 2010/0288047 A1 * | 11/2010 | Takagi | 73/514.32 |
| 2011/0290023 A1 * | 12/2011 | Takagi | 73/514.32 |
| 2012/0042729 A1 * | 2/2012 | Wang | 73/514.32 |

* cited by examiner

*Primary Examiner* — Helen Kwok
(74) *Attorney, Agent, or Firm* — Tung & Associates

(57) ABSTRACT

The present invention discloses a MEMS (Micro-Electro-Mechanical System, MEMS) device with a deformation protection structure. The MEMS device is located on a substrate, and it includes: a movable part; and a deformation protection structure, which has: a fixed plug, which is fixed on the substrate; multiple metal layers, including a top metal layer; and multiple plugs connecting the multiple metal layers. From top view, the top metal layer overlaps a portion of the movable part, and from cross section view, the bottom surface of the top metal layer is higher than the top surface of the movable part by a predetermined distance.

11 Claims, 6 Drawing Sheets

MEMS DEVICE AND DEFORMATION PROTECTION STRUCTURE THEREFOR AND METHOD FOR MAKING SAME

BACKGROUND OF THE INVENTION

1. Field of Invention

The present invention relates to a MEMS device with a deformation protection structure, a deformation protection structure for use in a MEMS device, and a method for manufacturing a MEMS device.

2. Description of Related Art

FIG. 1 shows a MEMS device disclosed in U.S. Pat. No. 4,901,570. As shown in FIG. 1, the MEMS device includes: a proof mass 11, a supporting substrate 12, cantilevers 13, a silicon nitride layer 14 formed on the surface of the proof mass 11 and the supporting substrate 12, and a bridge section 15. In normal operation, the MEMS device 10 generates signals by detecting a displacement of the proof mass 11, while for protecting the device from damage by abnormal operation (such as shock), the prior art limits the movement of the proof mass 11 in two ways: first, the bridge section 15 limits the rotation of the proof mass 11 and it also limits the out-of-plane movement of the proof mass 11 to some extent. Second, the cantilevers 13 which are fixed to the supporting substrate 12 by means of the silicon nitride layer 14, and higher than the proof mass 11 by a gap 16, limits the out-of-plane movement of the proof mass 11.

In this prior art, the proof mass 11 and the supporting substrate 12 are made by silicon while the cantilevers 13 are made by polysilicon. In other words, the MEMS device 10 has to be made before a metal interconnection process, because it uses the silicon substrate to form the proof mass 11 and the supporting substrate 12; thus, this prior art cannot be applied to a MEMS device which has a metal proof mass and a supporting silicon substrate under the proof mass. Moreover, this prior art has a drawback that the supporting substrate 12 needs to surround all outer sides of the proof mass 11 so that the cantilevers 13 fixed to the upper side of the supporting substrate 12 can surround the proof mass 11 to sufficiently limits the movement of the proof mass 11. Thus, the device requires a large area and is difficult to shrink.

FIG. 2 shows, by cross section view, a MEMS device 20 disclosed in U.S. Pat. No. 7,237,316. The MEMS device 20 is manufactured by the following steps: providing a silicon on insulator (SOI) wafer, and etching the glass plate 25 to define a proof mass 21, a stationary frame 22, and stoppers 23, etc. As shown in FIG. 2, in the MEMS device 20, the proof mass 21 and the stationary frame 22 are both made by etching the substrate. A gap 26 is formed between the stoppers 23 and the proof mass 21 by etching a part of an insulating layer 24; the dimension of the gap 26 is defined by the height of the insulating layer 24.

Similarly, this MEMS device 20 has to be made before the metal interconnection process, and therefore the prior art cannot be applied to a MEMS device which has a metal proof mass and a supporting silicon substrate under the proof mass. Also, the prior art has the same drawback that the supporting substrate 22 needs to surround all outer sides of the proof mass 21 so that the stoppers 23 fixed to the upper side of the supporting substrate 22 can surround the proof mass 21 to sufficiently limits the movement of the proof mass 21. Thus, the device requires a large area and is difficult to shrink.

In view of the above, the present invention proposes a MEMS device with a deformation protection structure, a deformation protection structure for use in a MEMS device, and a method for manufacturing a MEMS device, to overcome the drawback in the prior art.

SUMMARY OF THE INVENTION

An objective of the present invention is to provide a MEMS device with a deformation protection structure.

Another objective of the present invention is to provide a deformation protection structure for use in a MEMS device.

A further other objective of the present invention is to provide a method for manufacturing a MEMS device.

To achieve the foregoing objectives, in one perspective of the present invention, it provides a MEMS device on a substrate, the MEMS device comprising: a movable part; and a deformation protection structure including: a fixed plug fixed on the substrate; multiple metal layers including a top metal layer and a bottom metal layer, wherein the bottom metal layer is connected with the fixed plug; and multiple plugs connecting the multiple metal layers; wherein from top view, the top metal layer overlaps a portion of the movable part, and from cross section view, the bottom surface of the top metal layer is higher than the top surface of the movable part by a predetermined distance.

In the foregoing MEMS device, from top view, the deformation protection structure is preferably located inside of the MEMS device.

The foregoing MEMS device preferably comprises: at least one spring; a proof mass connected with the spring; and at least one sense electrode connected with the proof mass, wherein the sense electrode can be an in-plane sense electrode, an out-of-plane sense electrode, or it includes both, and wherein the movable part includes one or more of the followings: the spring, the proof mass and the sense electrode.

In another perspective of the present invention, it provides a deformation protection structure located on a substrate for a MEMS device having a movable part, the deformation protection structure comprising: a fixed plug fixed on the substrate; multiple metal layers including a top metal layer and a bottom metal layer, wherein the bottom metal layer is connected with the fixed plug; and multiple plugs connecting the multiple metal layers; wherein from top view, the top metal layer overlaps a portion of the movable part, and from cross section view, the bottom surface of the top metal layer is higher than the top surface of the movable part by a predetermined distance.

In a preferable embodiment of the foregoing deformation protection structure, from cross section view, the top metal layer and the uppermost one of the multiple plugs, in combination, form an approximately L-shape or T-shape.

In yet another perspective of the present invention, it provides a method for manufacturing a MEMS device, the method comprising: providing a substrate; forming a fixed plug fixed on the substrate; forming multiple metal layers and multiple plugs connecting the multiple metal layers, and defining patterns of the multiple metal layers and the multiple plugs to form a movable part and a fixed structure which are separated from each other, wherein the fixed structure is connected with the fixed plug; and forming a metal plug and a top metal layer on the fixed structure, wherein from top view, the top metal layer overlaps a portion of the movable part, and from cross section view, the bottom surface of the top metal layer is higher than the top surface of the movable part by a predetermined distance.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustration only, to show the interrelations between the layers/parts, but not drawn according to actual scale.

Figure 1:
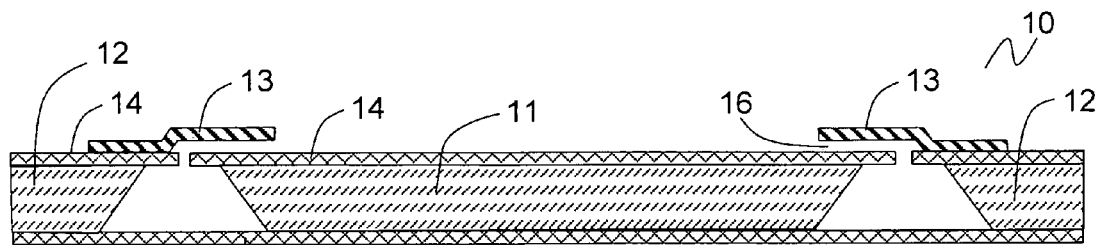
FIG. 1 shows a MEMS device disclosed in the U.S. Pat. No. 4,901,570.
Figure 2:
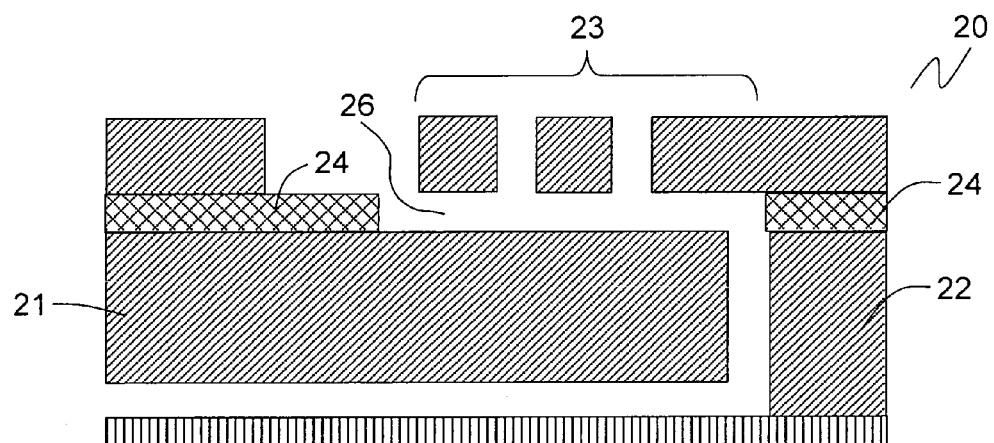
FIG. 2 shows, by cross section view, a MEMS device disclosed in the U.S. Pat. No. 7,237,316.
Figure 3:
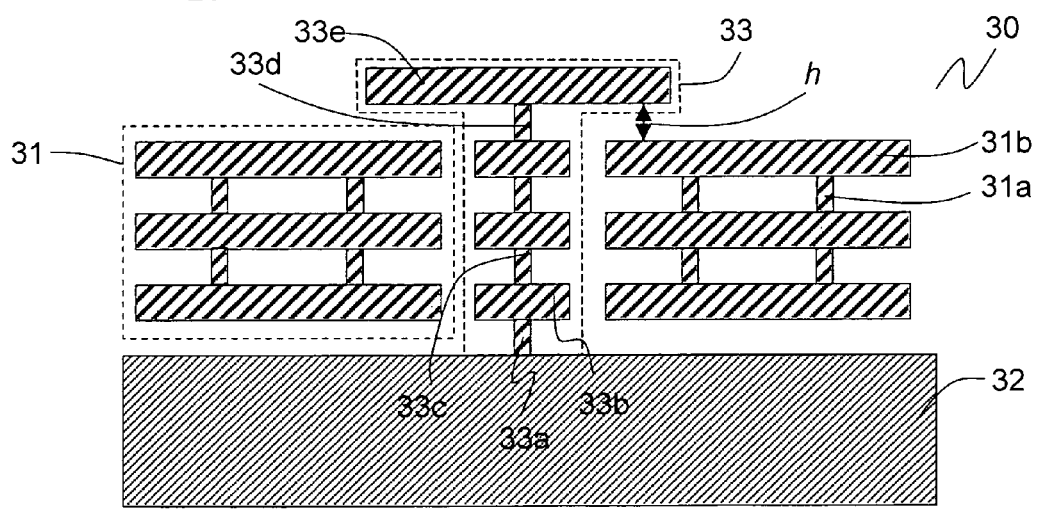
FIG. 3 shows, by cross section view, a first embodiment of the present invention.

FIG. 3 illustrates, by cross section view, a first embodiment according to the present invention. A MEMS device 30 is located on a substrate 32. The MEMS device 30 comprises a deformation protection structure 33, which includes: a fixed plug 33a fixed on the substrate 32, multiple metal layers 33b, multiple metal plugs 33c, an uppermost plug 33d, and a top metal layer 33e. As the figure shows, the MEMS device 30 further comprises a movable part 31, which is shown to include at least one metal plug 31a and multiple metal layers 31b, but it certainly can be formed by just one metal layer. The movable part 31 may be any part which is required to be movable in the MEMS device 30; it may be, for example but not limited to, a spring, a proof mass, or a sense electrode. Referring to FIG. 3, the bottom surface of the top metal layer 33e is higher than the top surface of the movable part by a predetermined distance h, and from top view, as shown in FIG. 4, the top metal layer 33e overlaps a portion of the movable part 31 such that the out-of-plane movement of the movable part 31 is limited within the predetermined distance h.

Figure 4:
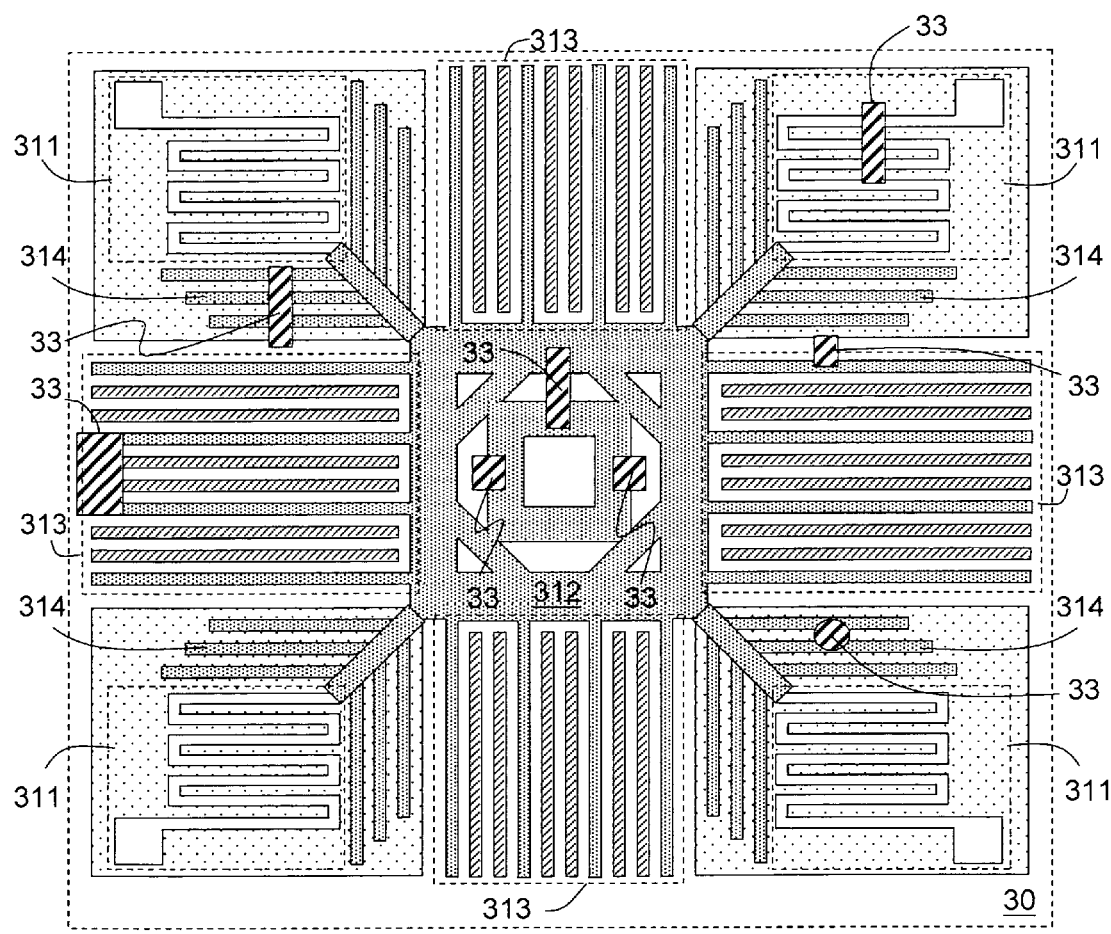
FIG. 4 shows, by top view, the MEMS device 30.

FIG. 4 illustrates, by top view, the MEMS device 30 which comprises springs 311, a proof mass 312 connected with the springs 311, sense electrodes, and deformation protection structures 33, wherein the sense electrodes include an in-plane sense electrode 313 and an out-of-plane sense electrode 314. As the figure shows, the deformation protection structures 33 can restrict the springs 311, proof mass 312 and the sense electrodes 313 and 314 from moving higher than the predetermined distance h (referring to FIG. 3) to prevent the movable parts from being distorted or broken by its unlimited out-of-plane movement. The locations of the deformation protection structures 33 shown in the figure are only for example; the deformation protection structures 33 can be placed at any suitable positions, and they can be of any regular or irregular layout, sizes and shapes, as long as the top metal layer 33e of a deformation protection structure 33 overlaps a portion of the movable part 31 (referring to FIG. 3). An important highlight here is that the deformation protection structures 33 can be located inside the MEMS device 30 instead of surrounding the MEMS device 30. Thus, the size of the MEMS device 33 is not substantially increased due to the deformation protection structures 33.

Figure 5A:
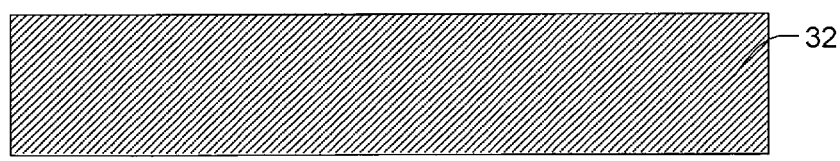
FIGS. 5A-5J show an embodiment to manufacture the deformation protection structure 33 according to the present invention.
Figure 5B:
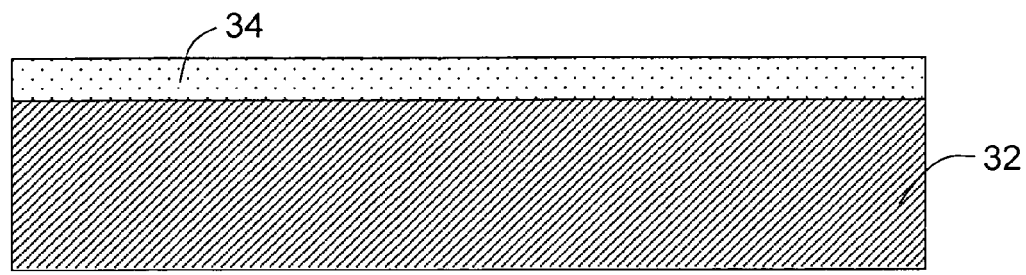
Figure 5C:
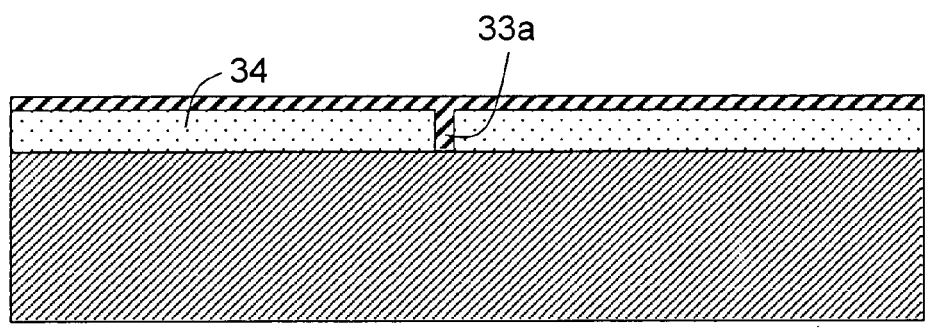
Figure 5D:
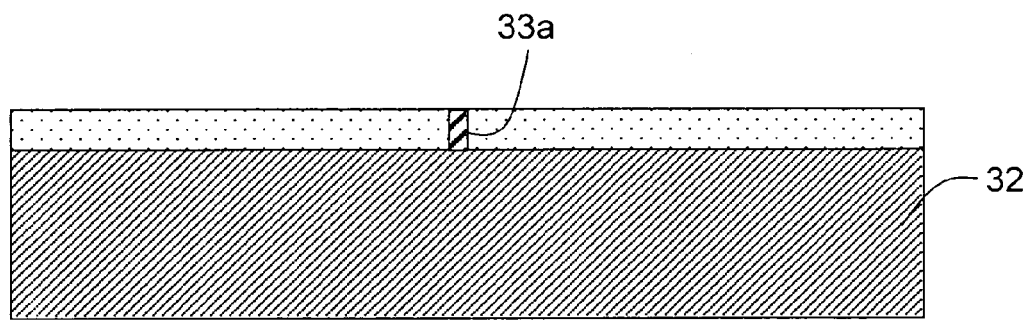
Figure 5E:
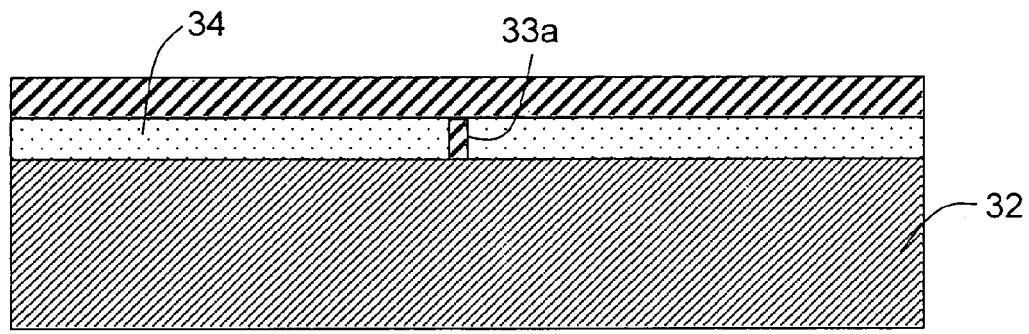
Figure 5F:
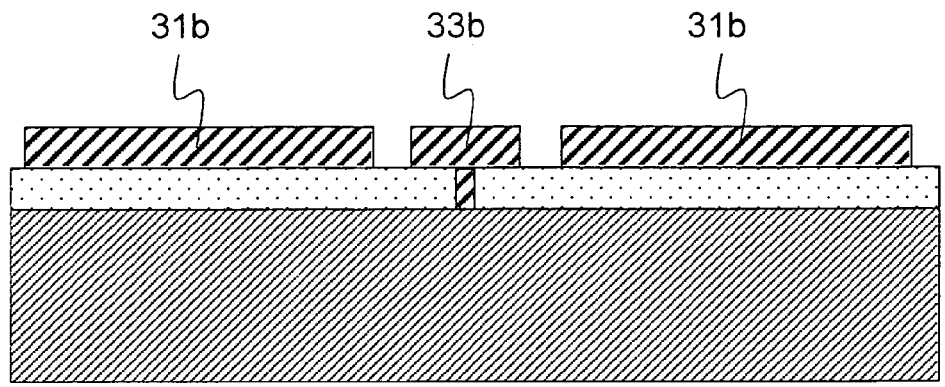
Figure 5G:
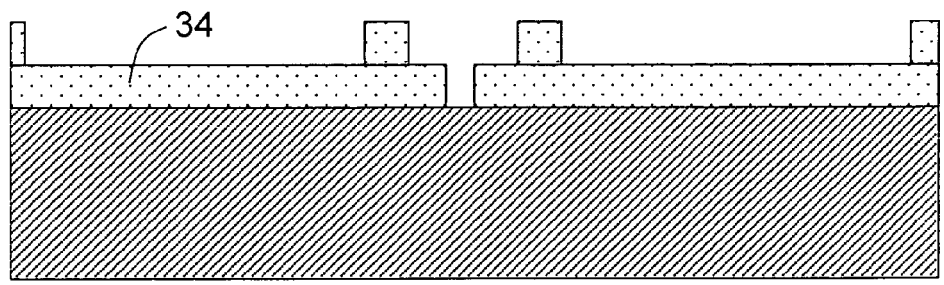
Figure 5H:
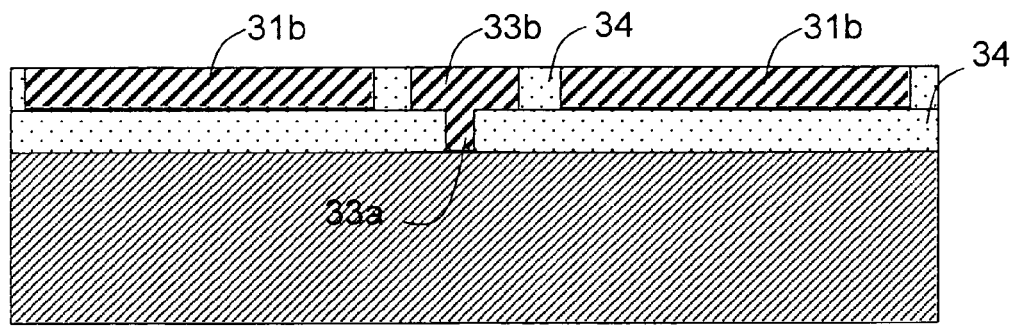

FIGS. 5A-5H illustrate, by cross section view, an embodiment to manufacture the deformation protection structure 33 according to the present invention. First, as shown in FIG. 5A, a substrate 32 is provided. Next, as shown in FIG. 5B, a sacrificial layer 34 is formed on the substrate 32, wherein the sacrificial layer 34 is made by, e.g., oxide. Then, the fixed plug 33a and a first metal layer 31b and 33b are formed by, for example but not limited to the steps shown in FIGS. 5C-5F: first, forming the fixed plug 33a on the substrate 32 by lithography, etching, deposition, and chemical mechanical polish (FIGS. 5C and 5D); then, depositing metal material on the surface of the sacrificial layer 34 and forming the first metal layer 31b and 33b by lithography and etching (FIGS. 5E and 5F). Or, as shown in FIGS. 5G and 5H, the fixed plug 33a and the first metal layer 31b and 33b may be formed by dual damascene.

Figure 5I:
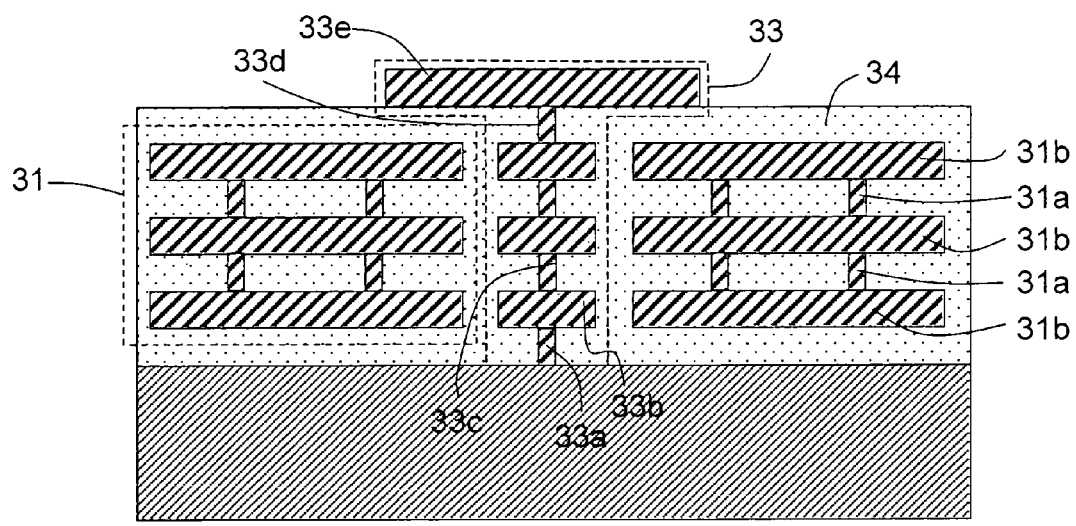
Figure 5J:
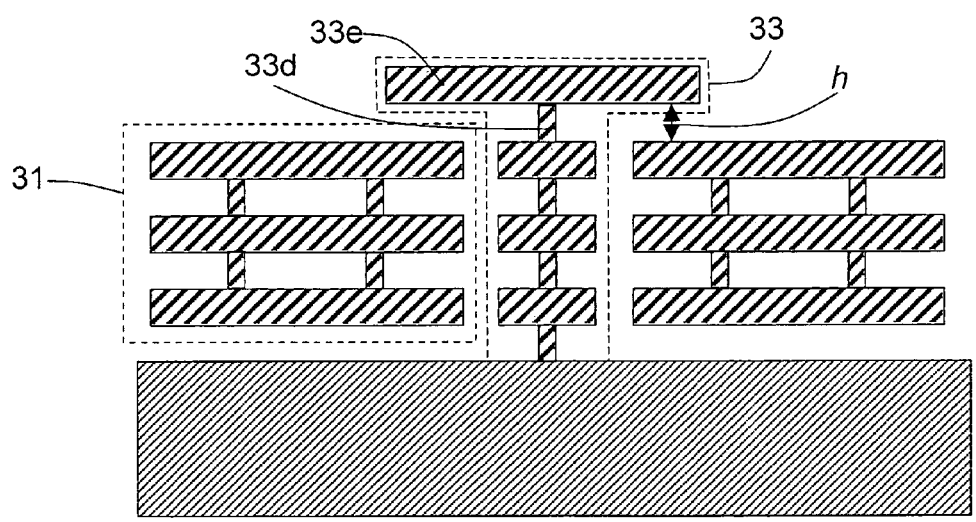

By repeating the above process in a similar way, i.e., depositing one sacrificial layer 34, forming one set of the metal plugs 31a and 33c, and forming one metal layer 31b and 33b, the multiple plugs 31a and 33c and the metal layers 31b and 33b can be formed. And after the uppermost layer of the metal plugs 33d and the top metal layer 33e are formed, the structure has a cross section view as shown in FIG. 5I. Next, as shown in FIG. 5J, the deformation protection structure 33 (and the MEMS device as well) can be released by, for example but not limited to, a selective wet-etching process or an HF vapor etching process to remove the sacrificial layer 34. In this embodiment the movable part 31 and the deformation protection structure 33 are released synchronously, but they can certainly be formed separately. Note that the top metal layer 33e is higher than the movable part 31 by a predetermined distance h, as shown in FIG. 5J; and from top view, the movable part 31 overlaps a portion of the deformation protection structure 33 such that the out-of-plane movement of the movable part 31 is limited within the predetermined distance h.

Figure 6A:
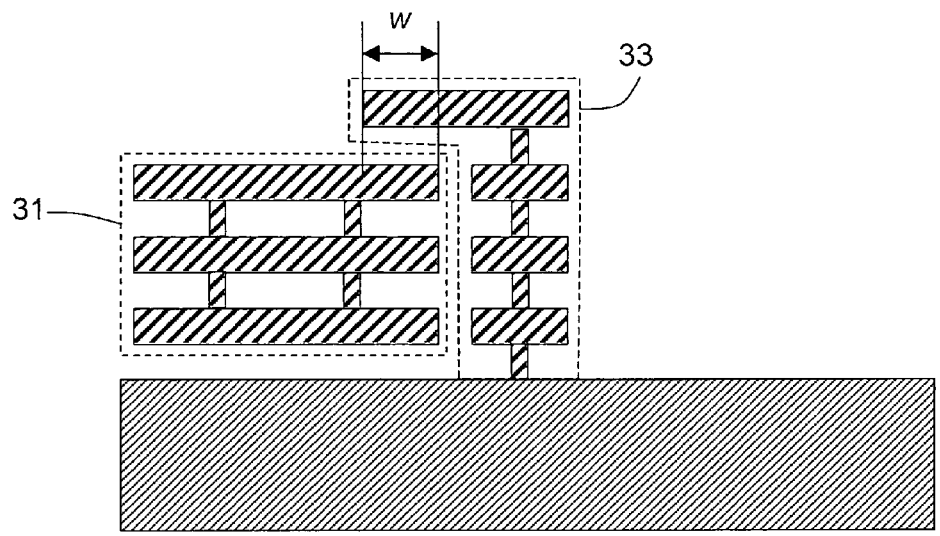
FIGS. 6A and 6B show two other embodiments of the present invention.
Figure 6B:
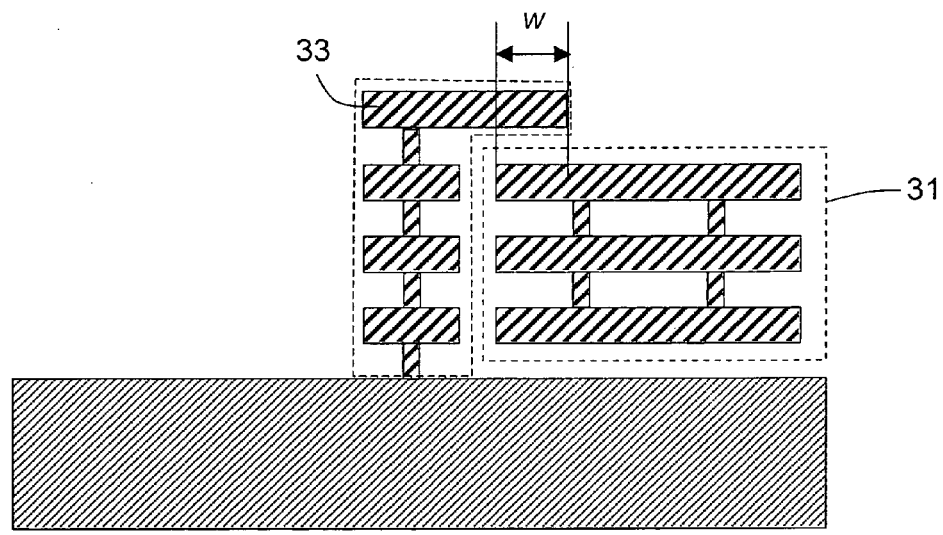

FIGS. 6A and 6B show two other embodiments of the present invention. As shown in FIGS. 6A and 6B, the shape of the deformation protection structure 33 in the present invention, from cross section view, is not limited to a T-shape which is shown as an example in the first embodiment, but alternatively can be an L-shape shown in FIGS. 6A and 6B. In the embodiments of FIGS. 6A and 6B, the movable part 31 overlaps a portion of the deformation protection structure 33, wherein from cross section view, the width of the overlapped portion is equal to w which is represented by a two-way arrow shown in FIGS. 6A and 6B, and the width w is preferably (but not limited to) at least 1 µm. The width w can be applied to the T-shape structure in the first embodiment. However, it should be understood that the width is related to the size and layout pattern of the MEMS device, and therefore the suggested number 1 µm should be regarded as an example instead of a restriction to the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the number of the metal layers in the present invention is not limited to the number shown in the embodiments, but can be any other number. As another example, in each layer, the number of the fixed plug or metal plug is not limited to one, but can be plural. As yet another example, from top view, the deformation protection structure is not limited to a rectangle shape or a circle shape as shown in FIG. 4, but also can be any other shape. Likely, the shape of each part in the MEMS device can be changed to any other shape instead of the shape as shown; for example, the proof mass 312 is not limited to a rectangle shape. Thus, the present invention should cover all such and other modifications and variations, which should be interpreted to fall within the scope of the following claims and their equivalents.

What is claimed is:

1. A MEMS device on a substrate, the MEMS device comprising:
   a movable part; and
   a deformation protection structure including:
      a fixed plug fixed on the substrate;
      multiple metal layers including a top metal layer and a bottom metal layer, wherein the bottom metal layer is connected with the fixed plug; and
      multiple plugs connecting the multiple metal layers;
      wherein from top view, the top metal layer overlaps a portion of the movable part, and from cross section view, a bottom surface of the top metal layer is higher than a top surface of the movable part by a predetermined distance.

2. The MEMS device of claim 1, wherein from top view, the deformation protection structure is located inside of the MEMS device.

3. The MEMS device of claim 1, wherein the MEMS device comprises:
   at least one spring;
   a proof mass connected with the spring; and
   at least one sense electrode connected with the proof mass;
   wherein the movable part includes one or more of the followings: the spring, the proof mass and the sense electrode.

4. The MEMS device of claim 3, wherein the sense electrode includes one or both of an in-plane sense electrode and an out-of-plane sense electrode.

5. The MEMS device of claim 1, wherein the top metal layer overlaps the portion of the movable part by a width of at least 1 μm.

6. A deformation protection structure located on a substrate for a MEMS device having a movable part, the deformation protection structure comprising:
   a fixed plug fixed on the substrate;
   multiple metal layers including a top metal layer and a bottom metal layer, wherein the bottom metal layer is connected with the fixed plug; and
   multiple plugs connecting the multiple metal layers;
   wherein from top view, the top metal layer overlaps a portion of the movable part, and from cross section view, a bottom surface of the top metal layer is higher than a top surface of the movable part by a predetermined distance.

7. The deformation protection structure of claim 6, wherein from cross section view, the top metal layer and an uppermost one of the multiple plugs, in combination, form an approximately L-shape or T-shape.

8. The deformation protection structure of claim 6, wherein from top view, the deformation protection structure is located inside of the MEMS device.

9. A method for manufacturing a MEMS device, comprising:
   providing a substrate;
   forming a fixed plug fixed on the substrate;
   forming multiple metal layers and multiple plugs connecting the multiple metal layers, and defining patterns of the multiple metal layers and the multiple plugs to form a movable part and a fixed structure which are separated from each other, wherein the fixed structure is connected with the fixed plug; and
   forming a metal plug and a top metal layer on the fixed structure, wherein from top view, the top metal layer overlaps a portion of the movable part, and from cross section view, a bottom surface of the top metal layer is higher than a top surface of the movable part by a predetermined distance.

10. The method of claim 9, wherein from top view, the fixed structure is located inside of the MEMS device.

11. The method of claim 9, further comprising;
   forming a sacrificial layer surrounding the multiple metal layers, the multiple plugs, and the metal plug and the top metal layer on the fixed structure; and
   etching to remove the sacrificial layer.

* * * * *